United States Patent Office 3,579,518
Patented May 18, 1971

3,579,518
ANTHRAPYRIMIDINE-SUBSTITUTED
ANTHRAQUINONE AMIDES
Eduard Moergeli, Muttenz, Switzerland, assignor to
Ciba Limited, Basel, Switzerland
No Drawing. Filed Feb. 20, 1968, Ser. No. 706,784
Claims priority, application Switzerland, Mar. 8, 1967,
3,394/67
Int. Cl. C07d 51/46
U.S. Cl. 260—256.4
7 Claims

ABSTRACT OF THE DISCLOSURE

Anthraquinone compounds of the formula

A—CONH—B in which A represents a 1,9-anthrapyrimidine radical bound to the —CONH-group in 2-position and B represents an anthraquinone residue bound to the NH-group in 1-position, the said anthraquinone radical containing an aroylamino group in 4-position, are valuable vat dyestuffs which dye cellulose-fibers orange shades of excellent fastness properties. These compounds are also valuable pigments which color plastic masses orange shades of outstanding fastness to light and migration.

---

The present invention is based on the observation that valuable vat dyestuffs may be obtained by condensing a 1,9-anthrapyrimidine-2-carboxylic acid halide with a 1-amino-4-aroylaminoanthraquinone.

The anthrapyrimidine carboxylic acid halides used as starting materials in the present process are advantageously derived from carboxylic acids of the formula

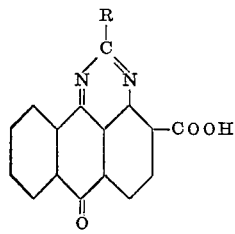

in which R represents an alkyl or aryl residue, but especially a hydrogen atom.

The acid halides may be obtained by treating the anthrapyrimidine carboxylic acids with agents that are capable of converting carboxylic acids into their halides, for example, chlorides or bromides, such agents being, in particular, phosphorus halides, for example, phosphorus pentabromide, phosphorus trichloride or phosphorus pentachloride, phosphorus oxyhalides or preferably thionyl chloride.

The treatment with the acidic halogenating agents is advantageously carried out in an organic solvent, for example, dimethylformamide or a chlorobenzene, for example, monochlorobenzene, a dichloro- or trichloro-benzene, toluene, xylene or nitrobenzene. If desired, the last five solvents specified may be used in conjunction with dimethylformamide or pyridine.

It is principally the acid chlorides of the anthrapyrimidine carboxylic acids that are specially suitable for use in the reaction in accordance with the invention. When using thionyl chloride as the acid halogenating agent, it is not necessary to separate the acid chloride from the reaction mixture, and condensation with the aminoanthraquinones may be carried out in the same solvent immediately after the preparation of the acid chloride.

The 1-amino-4-aroylaminoanthraquinones which are also used as starting materials advantageously contain a benzoyl residue as aroyl residue, which residue may also contain further substitutents, for example, alkyl, alkoxy, nitro, cyano or carbalkoxy groups, but especially halogen atoms, for example, bromine and chlorine, and particularly fluorine atoms. These starting materials may be obtained by processes known per se by reacting the corresponding leuco-1,4-diaminoanthraquinone in a molar ratio of 1:1 with the corresponding benzoyl halide, for example, benzoyl chloride, ortho-, meta- or para-chlorobenzoyl chloride, 2,4-dichlorobenzoyl chloride, ortho-, meta- or para-bromobenzoyl chloride, ortho-, meta- or para-fluorobenzoyl chloride, 2-fluoro-4-chlorobenzoyl chloride, ortho-, meta- or para-methylbenzoyl chloride, 2,4-dimethylbenzoyl chloride, ortho-, meta- or para-methoxybenzoyl chloride, para-nitrobenzoyl chloride, para-cyanobenzoyl chloride or para-carbomethoxybenzoyl chloride, followed by oxidation.

Compounds that are of special interest as starting materials are those corresponding to the formula

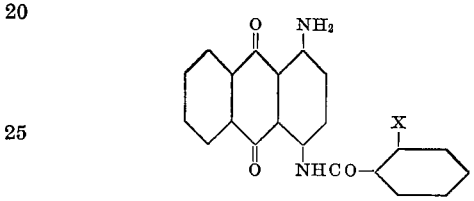

in which X represents a chlorine atom or preferably a fluorine atom.

The reaction between the anthrapyrimidine carboxylic acid halide and the aminoanthraquinone is advantageously carried out at an elevated temperature in a high-boiling point inert solvent, for example, chlorobenzene, a dichloro-, or trichloro-benzene, nitrobenzene or naphthalene, if necessary, in the presence of a tertiary base, for example, pyridine.

The dyestuffs obtained by the process of the invention are suitable for dyeing and printing a very wide variety of materials, for example, man-made or natural fibres, for example, fibres made from cellulose esters, polyesters, especially polyethylene terephthalates, polyamides, polyacrylonitrile and polyvinyl chloride, and also wool and silk; they are specially suitable for the vat dyeing and printing of textile materials made from natural or regenerated cellulose.

The dyestuffs obtained by the process of the invention are distinguished by poducing shades of excellent fastness to light having good properties of wet fastness.

The new products are also very valuable pigments that may be used for a very wide variety of purposes. For example, they may be used in a finely divided form for the spin coloration of organic compounds of high molecular weight, for example, viscose, cellulose ethers and esters, polyamides, polyurethanes and polyesters, and for pigmenting lacquers, lake-formers, solutions and products made from cellulose acetate, nitrocellulose, natural resins and synthetic resins, for example, polymerization resins or condensation resins, for example, aminoplasts, alkyd resins, phenoplasts, polyolefines, for example polyethylene, polypropylene or polystyrene, as well as polyvinyl chloride, polyacrylonitrile, rubber, casein, silicones and silicone resins. They may also be used with advantage in the manufacture of coloured pencils and laminated sheet material.

Compared with the isomeric dyestuff derived from anthrapyrimidine-2-carboxylic acid chloride and 1-amino-5-(ortho-fluorobenzoylamino-anthraquinone described in the example in Swiss patent specification No. 356,858, and compared with the dyestuff derived from anthrapyrimidine - 2 - carboxylic acid chloride and 1 - amino - 5-benzolyaminoanthraquinone described in PB Report No.

70,342, page 14,247, the dyestuffs obtained in accordance with the process of the invention are distinguished by better fastness to light and weathering.

The following examples illustrate the invention. Unless otherwise stated, the parts and percentages are by weight.

EXAMPLE 1

8 parts of thionyl chloride are added dropwise within 10 minutes to a mixture of 13.05 parts of 1,9-pyrimidine-anthrone-(10)-carboxylic acid-(2) and 135 parts by volume of trichlorobenzene while stirring at a temperature of 115 to 120° C. This temperature is maintained for one hour and then the excess of thionyl chloride is distilled from the practically clear solution in vacuo at about 110° C. The solution is poured into a mixture of 150 parts by volume of trichlorobenzene and 16 parts of 1 - (ortho-fluorobenzoylamino) - 4 - aminoanthraquinone and the batch is stirred for 3 hours at 115 to 120° C. and for 1 hour at 140 to 145° C. 6 parts by volume of ortho-fluorobenzoyl chloride are then added and, one hour later, the finely-crystalline orange dyestuff is isolated by filtration. It is washed with hot trichlorobenzene and alcohol until the filtrate runs colourless and then dried. 25.5 parts of the dyestuff of the formula

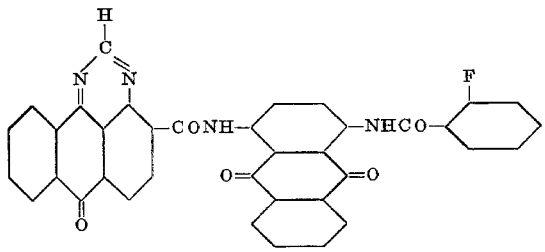

are obtained. It dyes cotton from a red-brown vat an orange shade which is fast to light.

When the dyestuff is brought into a state of fine division, for example, by kneading in the presence of sodium chloride, it may be used for colouring both lacquers and synthetic materials, for example, polyvinyl chloride, bright orange shades possessing excellent fastness to migration and outstanding fastness to light and weathering.

The 1-(ortho-fluorobenzoylamino) - 4 - aminoanthraquinone used in this example may be obtained according to known processes by the monoacylation of leuco-1,4-diaminoanthraquinone and subsequent oxidation. It melts at 290 to 291° C. (corrected).

Coloration procedure 1

1 part of the dyestuff obtained in the manner described in the first paragraph of the above example is vatted at 45° C. in 100 parts of water with 2 parts of sodium hydrosulphite in the presence of 4 parts by volume of 30% sodium hydroxide solution. The stock vat so obtained is added to a solution of 4 parts by volume of 30% sodium hydroxide solution and 2 parts of sodium hydrosulphite in 2,000 parts of water. 100 parts of cotton are dyed for one hour at 40 to 50° C. in the dyebaths so obtained in the presence of 100 parts of sodium chloride. The cotton is then squeezed, oxidized in the air, rinsed, acidified, rinsed again and then soaped at the boil. Its is dyed orange, and the dyeing displays very good properties of fastness.

Coloration procedure 2

A mixture is prepared from 65 parts of polyvinyl chloride, 35 parts of dioctyl phthalate and 0.2 part of the pigment obtained in the manner described in the first paragraph of the above example and worked to and fro for 7 minutes at 140° C. on a two-roller mill. An orange film possessing outstanding fastness to light and migration is obtained.

Coloration procedure 3

0.25 part of the pigment obtained in the manner described in the first paragraph of the above example, 40 parts of an alkyd-melamine stoving lacquer having a 50% solids content and 4.75 parts of titanium dioxide are ground for 24 hours in a rod mill. A thin film of the lacquer so obtained is applied to aluminium foil and stoved for one hour at 120° C. The coating of orange lacquer so obtained displays outstanding fastness to light and weathering.

EXAMPLE 2

By replacing the 1 - (ortho - fluorobenzoylamino) - 4-aminoanthraquinone used in the preceding example with an equimolecular amount of 1 - (ortho - chlorobenzoylamino) - 4 - aminoanthraquinone, a brown dyestuff is obtained, also in excellent yield. Any byproducts that may be present can be boiled out with nitrobenzene. When used in lacquers, the new product produces a brown shade possessing excellent fastness to plasticizers and solvents and also maximum fastness to light.

The 1 - (ortho - chlorobenzoylamino) - 4 aminoanthraquinone used in this example may be obtained according to a known process by monobenzoylation of leuco-diaminoanthraquinone-(1,4) and subsequent oxidation. It melts at 280 to 281° C. (corrected).

EXAMPLE 3

3.6 parts of thionyl chloride are added dropwise at 115 to 120° C. to a mixture of 5.85 parts of 1,9-anthrapyrimidine 2-carboxylic acid and 59 parts by volume of trichlorobenzene. The batch is stirred for about 45 minutes until formation of the 1,9-anthrapyrimidine-2-carboxylic acid chloride is complete. The excess of thionyl chloride is immediately distilled in vacuo with 10 parts by volume of the solvent, and the solution so obtained is flushed into a mixture of 7.8 parts of 1-amino-4-(para-nitrobenzoylamino)-anthraquinone and 120 parts by volume of trichlorobenzene with 10 parts by volume of trichlorobenzene. The batch is stirred for 20 hours at 115 to 120° C. The dyestuff which forms is isolated by filtration at 100° C., washed free from impurities first with hot trichlorobenzene and then with alcohol and dried. The yield is 12.6 parts of a product which colours polyvinyl chloride and lacquers a reddish yellow shade which is fast to light.

By replacing the 1-amino-4-(para-nitrobenzoylamino)-anthraquinone used in the above example, which has a melting point of 305° C. (corrected), with an equimolecular amount of any one of the following compounds: 1-amino - 4 - (para-anisoylamino)-anthraquinone (M.P. 255° C., corrected), 1-amino-4-(meta-chlorobenzoylamino)-anthraquinone (M.P. 260° C., corrected), 1-amino-4-(para-chlorobenzoylamino)-anthraquinone (M.P. 259° C., corrected), 1-amino-4-(ortho, para-dichlorobenzoylamino)-anthraquinone 1 - amino-4-(para-bromobenzoylamino)-anthraquinone (M.P. 263° C., corrected) or 1-amino-4-(para-toluylamino)-anthraquinone (M.P. 270° C., corrected), products are obtained which colour synthetic materials brownish yellow shades possessing excellent fastness to light.

These products dye cotton reddish yellow shades displaying outstanding fastness to light and good properties of wet fastness.

I claim:

1. An anthraquinone dyestuff of the formula

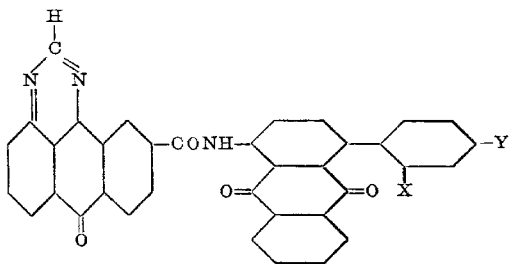

in which each of X and Y may be hydrogen, fluorine, chlorine, nitro, bromo, methoxy or methyl.

2. An anthraquinone vat dyestuff of the formula

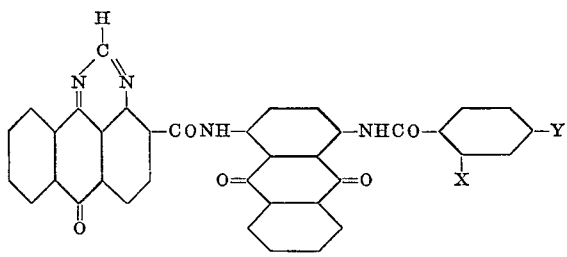

in which X and Y each represents a hydrogen, chlorine or fluorine atom.

3. The compound as claimed in claim 2 of the formula

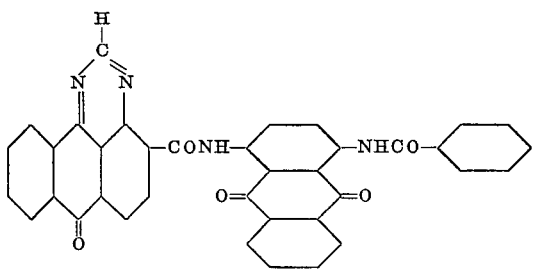

4. The compound as claimed in claim 2 of the formula

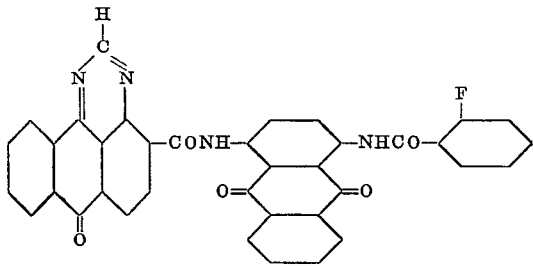

5. The compound as claimed in claim 2 of the formula

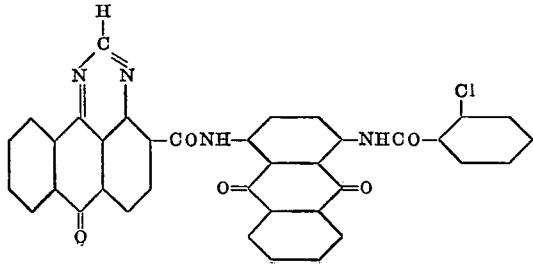

6. The compound as claimed in claim 2 of the formula

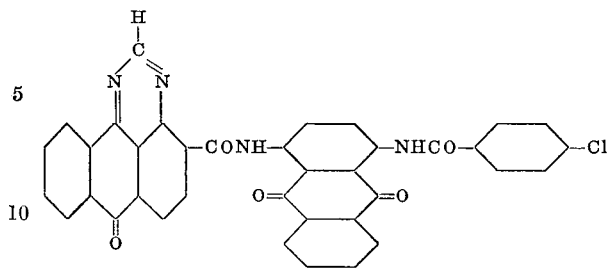

7. The compound as claimed in claim 2 of the formula

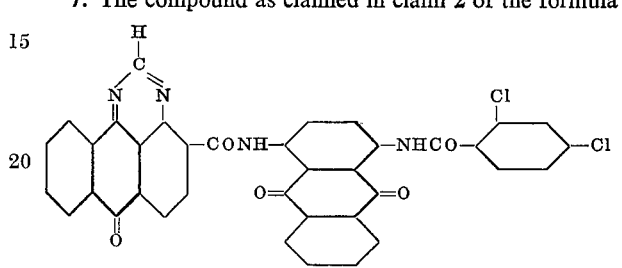

References Cited
UNITED STATES PATENTS
356,858    1961    Switzerland _____ 260—256.4

ALEX MAZEL, Primary Examiner
R. J. GALLAGHER, Assistant Examiner

U.S. Cl. X.R.
8—34; 117—132; 260—41